US012664045B2

(12) United States Patent　　　　(10) Patent No.:　US 12,664,045 B2
Sforzin et al.　　　　　　　　　　　　(45) Date of Patent: 　　Jun. 23, 2026

(54) LOCKED RAID MEMORY DEVICES

(71) Applicant: Micron Technology, Inc., Boise, ID (US)

(72) Inventors: Marco Sforzin, Cernusco Sul Naviglio (IT); Su Wei Lim, Bayan Lepas (MY); Emanuele Confalonieri, Segrate (IT)

(73) Assignee: Micron Technology, Inc., Boise, ID (US)

( * ) Notice: Subject to any disclaimer, the term of this patent is extended or adjusted under 35 U.S.C. 154(b) by 13 days.

(21) Appl. No.: 18/775,804

(22) Filed: Jul. 17, 2024

(65) Prior Publication Data

US 2026/0023644 A1　　Jan. 22, 2026

(51) Int. Cl.
　G06F 11/10　　　　(2006.01)
(52) U.S. Cl.
　CPC ...... G06F 11/1004 (2013.01); G06F 11/1068 (2013.01)
(58) Field of Classification Search
　None
　See application file for complete search history.

(56) References Cited

U.S. PATENT DOCUMENTS

| | | | | | |
|---|---|---|---|---|---|
| 8,464,093 | B1 * | 6/2013 | Swenson | ............... | G06F 11/108 |
| | | | | | 714/755 |
| 2015/0178155 | A1 * | 6/2015 | Kim | ................... | G06F 11/1012 |
| | | | | | 714/758 |
| 2016/0357631 | A1 * | 12/2016 | Cohen | ................... | G06F 3/0619 |

| | | | | | |
|---|---|---|---|---|---|
| 2019/0163563 | A1 * | 5/2019 | Kim | .................... | G06F 11/1443 |
| 2020/0218608 | A1 * | 7/2020 | Zhu | ...................... | G11C 11/4096 |
| 2020/0403779 | A1 * | 12/2020 | Gopal | ................. | G06F 11/1044 |
| 2021/0055985 | A1 * | 2/2021 | Lee | ....................... | G11C 29/028 |
| 2021/0248119 | A1 * | 8/2021 | Li | ......................... | G06F 3/0685 |
| 2022/0229725 | A1 * | 7/2022 | Kanter | .................. | H03M 13/09 |
| 2023/0244569 | A1 * | 8/2023 | Fay | ..................... | G06F 11/1088 |
| | | | | | 714/6.24 |

OTHER PUBLICATIONS

J. Sim, G. H. Loh, V. Sridharan and M. O'Connor, "A Configurable and Strong RAS Solution for Die-Stacked DRAM Caches," in IEEE Micro, vol. 34, No. 3, pp. 80-90, May-Jun. 2014, (Year: 2014).*
J. Kim, J. Lee, J. Choi, D. Lee and S. H. Noh, "Improving SSD reliability with RAID via Elastic Striping and Anywhere Parity, " 2013 43rd Annual IEEE/IFIP International Conference on Dependable Systems and Networks (DSN), Budapest, Hungary, 2013, pp. 1-12, (Year: 2013).*

* cited by examiner

*Primary Examiner* — Daniel F. McMahon
(74) *Attorney, Agent, or Firm* — Schwegman Lundberg & Woessner, P.A.

(57)　　　　　ABSTRACT

Methods, memory devices, and systems for utilizing DDR5 DRAM dice without SEC parity bits, while still providing chipkill protection and RAS performance are described. The disclosed devices utilize a solution based upon locked RAID (LRAID) which omits the on-die SEC bits but retains RAS protections including chipkill protections. The system achieves this protection by replacing the Reed-Solomon parity bits with RAID parity bits, CRC bits, end-to-end SEC bits, and an end-to-end CRC. The SEC protection is enabled, in some examples, by a memory controller, such as by an on-ASIC memory controller making this an on-ASIC SEC rather than an on-die SEC.

20 Claims, 8 Drawing Sheets

200

| | 0 | 1 | 2 | 3 | 4 | 5 | 6 | 7 | 8 | 9 |
|---|---|---|---|---|---|---|---|---|---|---|
| BL16 | DATA WITHOUT SEC | DATA WITHOUT SEC | DATA WITHOUT SEC | DATA WITHOUT SEC | DATA WITHOUT SEC | DATA WITHOUT SEC | DATA WITHOUT SEC | DATA WITHOUT SEC | LRAID CRC (32b) / E2E SEC (12b) E2E CRC (12b) MD (8b) | RAID PARITY (64b) |
| DQ4 | 210 | 212 | 214 | 216 | 218 | 220 | 222 | 224 | 226 | 228 |

40 BIT CHANNEL

FIG. 6

LOCKED RAID MEMORY DEVICES

TECHNICAL FIELD

Embodiments pertain to computer memory systems. Some embodiments relate to volatile dual data rate (DDR) memory with reduced cost architectures.

BACKGROUND

Memory devices for computers or other electronic devices may be categorized as volatile or non-volatile. Volatile memory requires power to maintain its data, and includes random-access memory (RAM), dynamic random-access memory (DRAM), synchronous dynamic random-access memory (SDRAM), among others. Non-volatile memory may retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetore-sistive random-access memory (MRAM), among others.

DDR memory (Double Data Rate memory) is a type of random-access memory (RAM) commonly used in elec-tronic devices such as computers. DDR memory is so named because it transfers data twice per clock cycle: once on the rising edge, and once on the falling edge of the clock cycle. This effectively doubles the data transfer rate compared to single data rate (SDR) RAM.

A memory controller, such as part of a microprocessor, communicates with one or more DDR Modules, or Dual Inline Memory Modules (DIMMs), over one or more memory buses or memory channels. A DIMM may be organized into one or more memory ranks that specify multiple chips (e.g., eight chips) that are addressed in parallel. Modern DIMMS may include one rank, two ranks, four ranks, or eight ranks. Each rank may include multiple banks and each bank may include multiple arrays to form a hierarchy in the DRAM.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 6 and 7 illustrate payload encoded in the various coding schemes according to some examples of the present disclosure.

DETAILED DESCRIPTION

Increases in DRAM chip densities have led to increases in error rates. To combat these error rate increases, DDR5 memory chips may include on-die ECC which detects and corrects errors before sending data to the CPU. This ECC may be an on-die Single Error Correcting code (SEC) working on a payload of 128 bits and requiring 8 bits for storing the parity value. These 8 additional cells for every 128 cells of data increase the die area and consequently the cost of the DRAM chip.

The on-die SEC does not protect against the so-called "chip kill" situation in which data on an entire die experi-ences errors. To protect against chip kill, DDR5 DIMMs used in applications requiring reliability, availability, and serviceability (RAS) feature additional protection in the form of Reed-Solomon coding. In a typical configuration, 10 DDR dice are positioned in the memory system, with two of those dice storing the Reed-Solomon parity bits. This con-figuration results in significant amounts of cells used to store various error correction and detection data.

Figure 1:
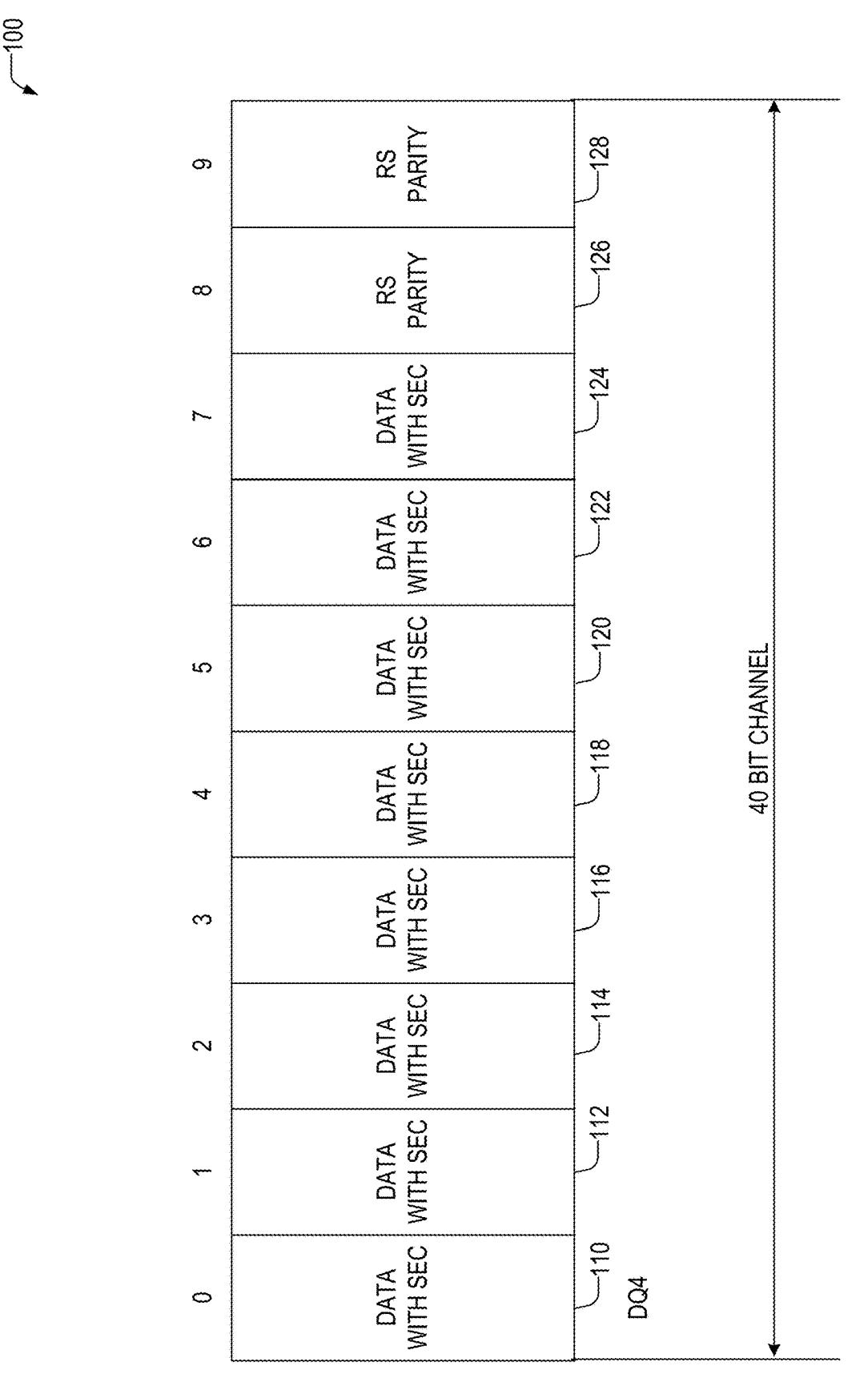
FIG. 1 illustrates a typical DIMM configuration according to some examples of the present disclosure.

FIG. 1 illustrates a typical DIMM configuration 100 with 10 dice 110, 112, 114, 116, 118, 120, 122, 124, 126, 128. Each die comprises a DQ (data query) bus of 4 bits, with a burst length (BL) of 16 bits. Dice 110, 112, 114, 116, 118, 120, 122, and 124 store data with SEC parity bits and dice 126, and 128 store Reed-Solomon parity bits. Each of dice 110, 112, 114, 116, 118, 120, 122, and 124 stores 4 bits of parity for each 128 bits of data. As can be appreciated from the Figure, a significant amount of storage space is utilized to store both the parity bits and the Reed-Solomon parity bits.

Disclosed in some examples are memory devices, meth-ods, and systems for utilizing DDR5 DRAM dice without SEC parity bits, while still providing chipkill protection and RAS performance. The disclosed devices utilize a solution based upon locked RAID (LRAID) which omits the on-die SEC bits but retains RAS protections including chipkill protections. The system achieves this protection by replac-ing the Reed-Solomon parity bits with RAID parity bits, CRC bits, end-to-end SEC bits, and an end-to-end CRC. The SEC protection is enabled, in some examples, by a memory controller, such as by an on-ASIC memory controller mak-ing this an on-ASIC SEC rather than an on-die SEC.

Figure 2:
FIG. 2 illustrates an updated DIMM configuration accord-ing to some examples of the present disclosure.

FIG. 2 illustrates a DIMM configuration 200 according to examples of the present disclosure. Dice 210, 212, 214, 216, 218, 220, 222, and 224 are DICE without on-die SEC parity bits. That is, the dice do not store 8 bits of parity for every 128 bits of data, instead, storing all host data. Additionally, DICE 226 and 228 do not store the Reed-Solomon data. Rather, die 226 stores LRAID CRC bits (e.g., 32 CRC bits), end-to-end SEC bits (e.g., 12 bits), end-to-end CRC bits (12 bits), and in some configurations, includes space for meta-data (8 bits). Die 228 stores RAID parity bits. In some examples the RAID parity bits are created using an XOR parity operation on the data in the equivalent position of dies 0-7. That is, the value at bit position 0 in die 1 through 7 are XORed and the result is stored in bit position 0 in die 9. The 32-bit LRAID CRC is used to detect and isolate any errors when the data is read from the DRAM. Any errors found using the LRAID CRC bits may be corrected using the RAID parity bits stored in die 228. The end-to-end SEC in die 226 is a single error correction code implemented in the controller that is applied to all the data on dies 0-9. The end-to-end SEC on die 226 can correct just one bit and is included to increase reliability. A single bit error has a higher probability than a row or chip failure. The end-to-end CRC bits in die 226 E2E CRC detects any errors in the full path inside the device. It is in addition to any other detection mechanism inside the device. The E2E CRC reduces SDC (Silent Data Corruption) to a design target level.

While the CRC and RAID can correct a single bit error efficiently, if the memory device experiences two or more bit errors in different dies, it is expensive to correct using just CRC/RAID as it would require 9*64 tests (single parity check codeword) which is computationally inefficient. The end-to-end SEC stored in die 226 allows more efficient correction of these errors. In some examples, the end-to-end SEC is a Hamming Code.

Due to the operation of the end-to-end SEC, on a chipkill event, the end-to-end SEC may not be able to efficiently correct the error and may actually make the situation worse by producing another bit error somewhere else during decoding. In some examples, there are two solutions to this issue. The first solution is to apply the SEC and continue decoding. If the system encounters uncorrectable errors in further decoding, the system may then attempt to decode the data without first applying the end-to-end SEC. A second solution is to use a special end-to-end SEC that is able to bind the additional errors to the same die—e.g., the chip-killed die.

Data arrives at controller from the memory cells and the first operation applied is the end-to-end SEC decoder. After the SEC decoding, the controller checks for errors using the LRAID CRC check. If there are no errors, the end-to-end CRC is applied and if that passes, then the data is sent to the host. Errors found using the LRAID-CRC check may be corrected using the RAID parity for each die and the LRAID CRC is rechecked. If no errors are found, the end-to-end CRC may be applied and if that passes, the data is sent to the host. If CRC errors are found and only one of the corrections passed the CRC, then the corrected data is sent to the host. If more than one correction passed CRC or if none of the corrections passed the CRC, then the process is repeated using the raw data from the memory cells without utilizing the SEC decoding. Providing both CRC and parity provides chipkill protection and the SEC mitigates removal of on-die SEC.

In some examples, the end-to-end (e2e) CRC (e.g., the 12-bit CRC) is applied to the data in dice 210, 212, 214, 216, 218, 220, 222, 224 and the metadata in die 226 before the LRAID-CRC. The LRAID CRC is then applied to the data in the dice 210, 212, 214, 216, 218, 220, 222, 224, the metadata and the end-to-end CRC. In some examples, the end-to-end (E2E) SEC is applied to everything (except itself).

Figure 3:
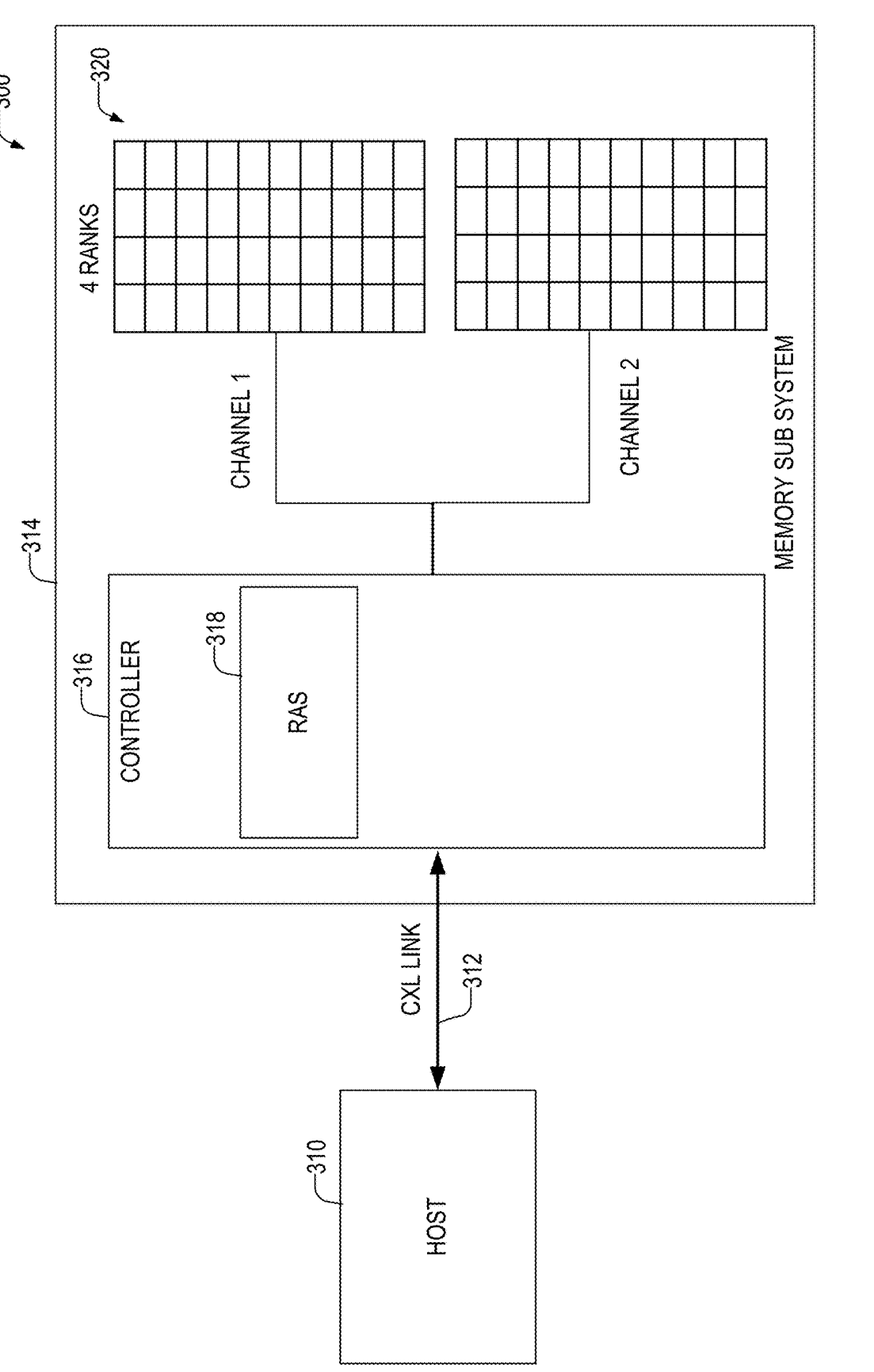
FIG. 3 illustrates an example logical diagram of a memory system in a CXL environment according to some examples of the present disclosure.

FIG. 3 illustrates an example logical diagram 300 of a memory system in a CXL environment according to some examples of the present disclosure. Compute Express Link (CXL) is an open interface standard designed to connect central processing units (CPUs), graphics processing units (GPUs), accelerators and other compute devices to memory devices in a way that achieves high bandwidth and low latency. One application of CXL enables memory disaggregation by physically decoupling memory resources from the compute complex. CXL allows memory devices like high-bandwidth memory (HBM) and high-bandwidth cache-coherent memory to be disaggregated into resource pools that can be dynamically allocated to match application demands.

This provides flexibility to independently scale memory capacity and memory bandwidth relative to compute capability.

Compute Express Link (CXL) leverages the PCI Express (PCIe) physical and electrical interface for interoperability while enabling advanced capabilities through extensions to the PCIe infrastructure. CXL extends the PCIe interface and protocol to support advanced capabilities like cache coherence, memory semantics, and memory disaggregation. Example extensions include adding support for CXL packets and headers to enable new memory-centric protocols while reusing the reliable PCIe transport. CXL also defines additional infrastructure like sideband signaling for memory control and management.

Host 310 may be one or more other computer systems, a processor, or the like. The CXL link 312 may be a PCI-e physical link that runs CXL protocols and links one or more CXL components, such as host 310 and memory subsystem 314. Memory subsystem 314 may include a controller 316 which includes RAS component 318 which provides for reliability, availability and serviceability by implementing the Locked-RAID techniques described herein. Memory controller 316 manages the memory cells 320 represented by two channels and 4 ranks of RAM. A person of ordinary skill in the art with the benefit of the present disclosure will recognize that the configuration shown in FIG. 3 is exemplary and additional or fewer channels and ranks may be utilized.

Figure 4:
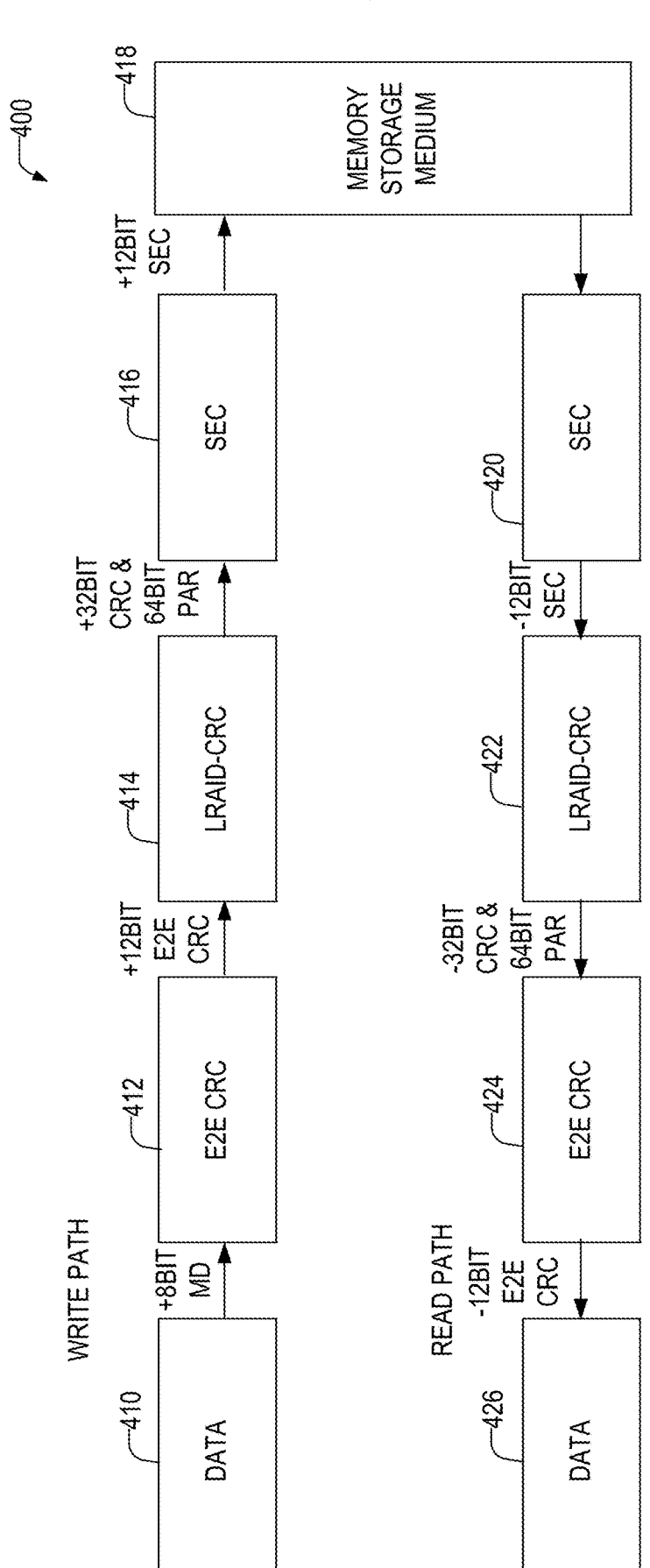
FIG. 4 illustrates a flowchart of a data path to and from the memory storage medium according to some examples of the present disclosure.

FIG. 4 illustrates a flowchart 400 of a data path to and from the memory storage medium 418 according to some examples of the present disclosure. At operation 410, data is received at the controller for writing to the RAM. At operation 412, a first end-to-end CRC is calculated from the data from the host. This CRC is used to reduce the chances for silent data corruption (SDC). This end-to-end CRC is placed in die 226. From there, the host data and the e2e CRC data is then used to calculate the LRAID-CRC at operation 414 and this value is stored in the LRAID CRC in die 226. The host data, e2e CRC data, and the LRAID CRC data is then used to calculate the SEC at operation 416. The host data, e2e CRC data, the LRAID CRC data and the SEC data is then stored on the storage medium 418.

Upon reading the data from the memory storage medium 418, FIG. 4 shows the sequence of how the data is decoded. At operation 420 the SEC is applied. From there, the LRAID-CRC is checked at operation 422. If the LRAID-CRC shows that the data is correct, then at operation 424 the e2e CRC is checked and if the e2e CRC indicates that the data is good, then the data 426 is sent to the host.

Figure 5:
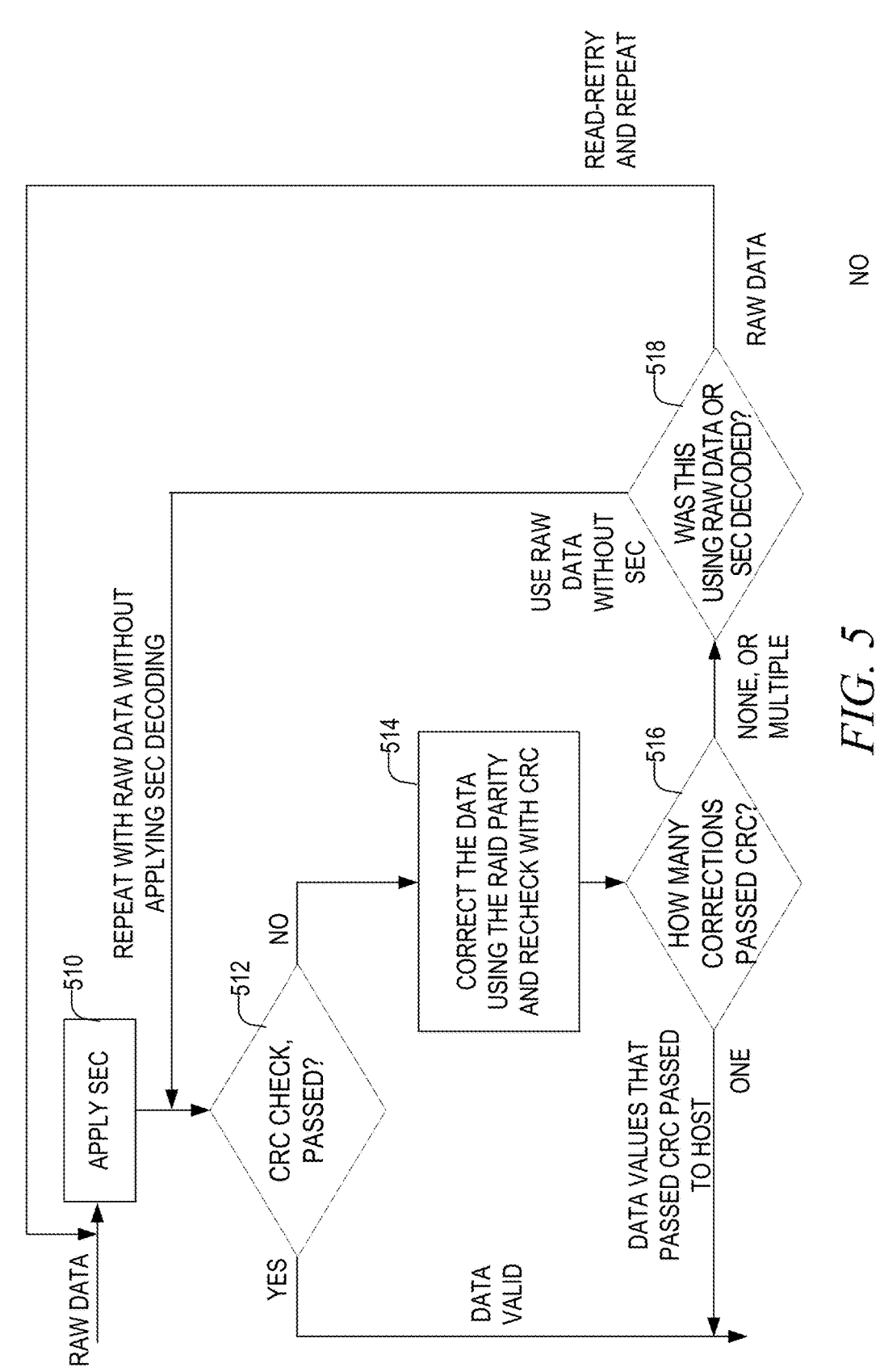
FIG. 5 illustrates a flow chart of a method of reading data from a memory according to some examples of the present disclosure.

FIG. 5 illustrates a flow chart of a method of reading data from a memory according to some examples of the present disclosure. Method 500 may be performed, in some examples, by a memory controller, such as controller 316 and in some examples by a RAS component 318 of the memory controller 316. Data from the memory device, such as shown in FIG. 2, may arrive at the controller. The end-to-end SEC is applied to this data at operation 510 to produce SEC processed data. At operation 512, the LRAID CRC information is used to perform a CRC check on the SEC processed data. If the check passes, processing continues by sending the data to the host or by applying the end-to-end CRC first. If the data does not pass, then the LRAID parity data is used to correct the data. Each correction attempt is then checked to see if that particular data passes CRC. At operation 516, a CRC is performed against each correction and a determination is made as to how many of the corrections passed the CRC. If only one passes the CRC, then that corrected value may be sent to the host or further processed (e.g., by applying the end-to-end CRC then sending the value to the host). If no corrections, or if multiple corrections pass the CRC, then, at operation 518 it is determined if this was using raw data, or using data where the SEC was applied. If it was using data where the SEC was applied, operations 512, 514, and 516 are performed again using the raw data without applying the SEC. If it was using the raw data (e.g., as a result of a previous iteration through operations 512, 514, and 516, then other error handling methods may be utilized, such as a read-retry (which may cause method 500 to be repeated on the read retry).

In some examples, rather than retry the parity corrections with data that does not have the end-to-end SEC applied, a bounded SEC with partial correction capabilities may be used. To preserve the capability to correct errors, a bounded SEC may be used that has the additional property of an ability to correct all the double bit error (DB) in the same prefetch composed of the same single bit error (SB) in two different memory dice. A single bit is in error in the same prefetch. Prefetch is the amount of data accessed with the command (64 bit per die in case of BL16 with x4-mode component). The 4 in ×4 is the number of DQs. In ×8-mode components in BL32 the prefetch is 256 bit. In some examples, if there are 10 dice, the number of subsets of 2 dice is $$\binom{10}{2} = 45.$$

Since there are 64 bits in each die, the total number of DB configurations to correct is 64·45=2880. The total number of syndromes value may then be 1+64·10+64·45=3521, and therefore a SEC with at least 12 parity bits may be: $2^{12}$=4096>3521. Bounded SEC is a Single Error Corrector with the Bounded property. The bounded property consists in having a partition of the codewords in regions and if a multiple error is completely contained in a region then the miscorrection operated by the SEC is contained in the same region. In this way a SEC-uncorrectable error contained in a region will remain in the same region even after a miscorrection operated by the SEC. This is done to allow the RS to work correctly even in case of SEC miscorrection. Here the bounded SEC is also increased (12 b instead of 10 b) because it is a special bounded SEC. It has an additional property: it can also correct a subset of all the possible double bit errors. This subset is composed of all the pairs of bits in the same position of the prefetch belonging to different dies. The number of such DB errors is 2880.

Figure 6:
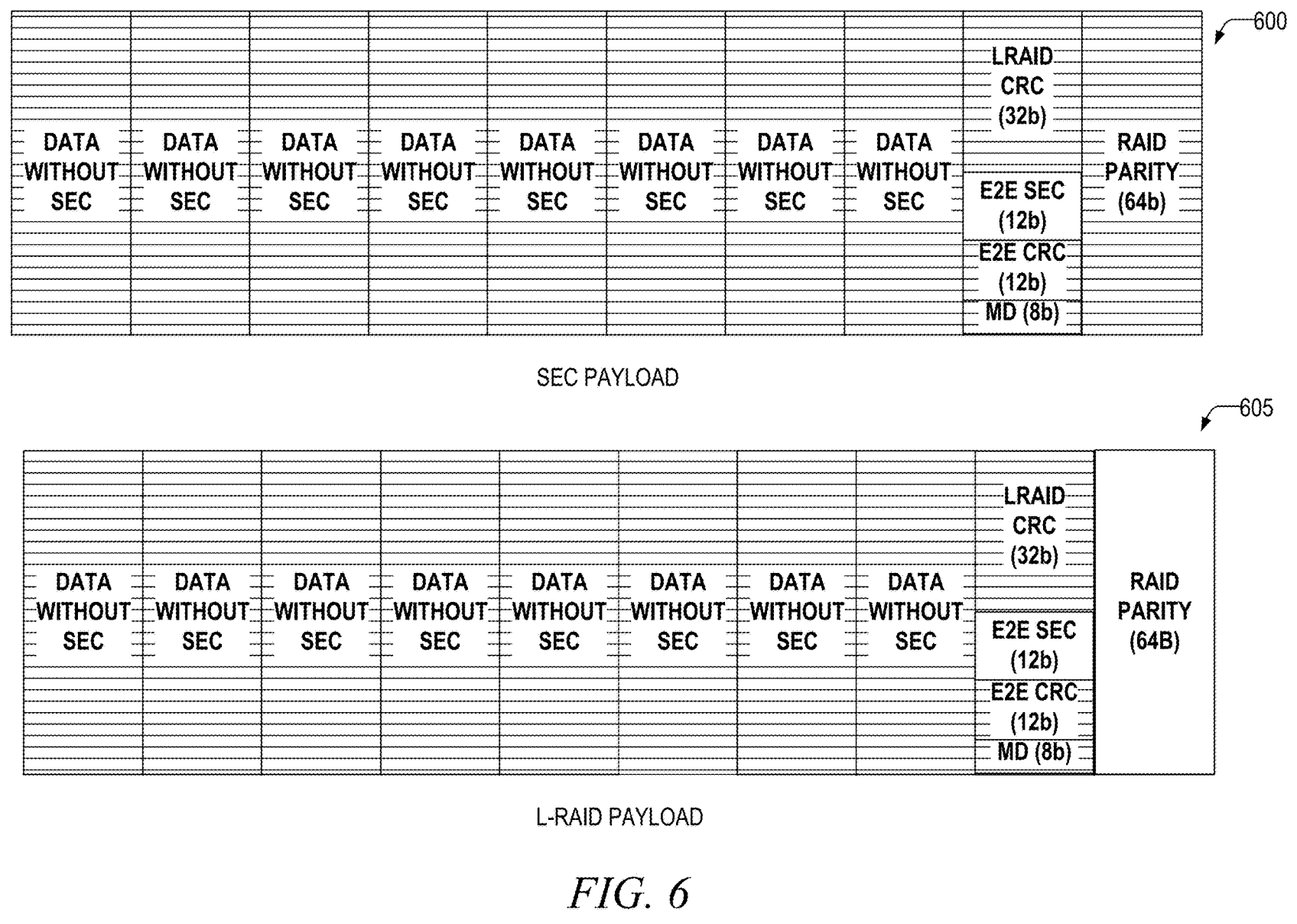
Figure 7:
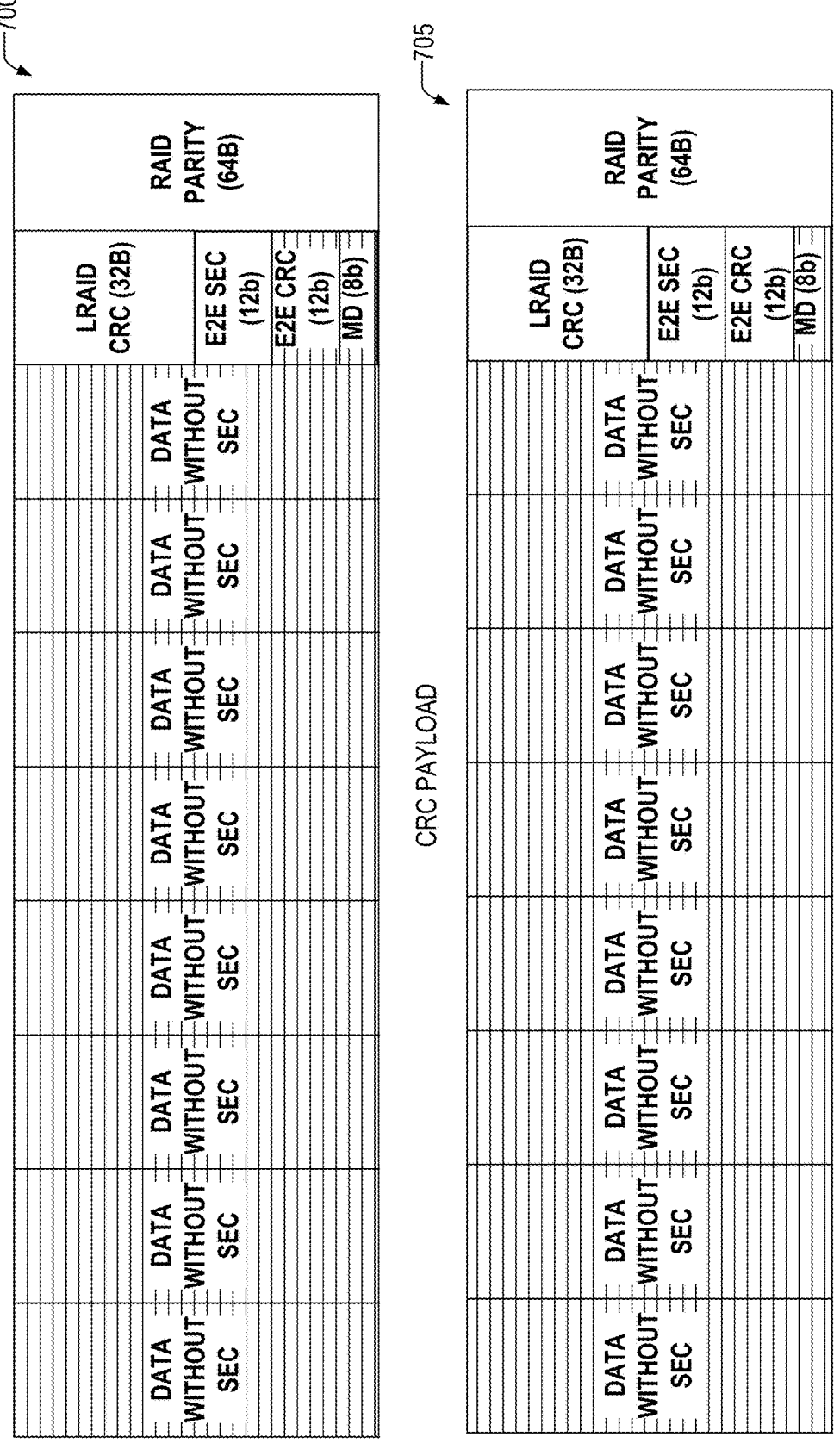

FIGS. 6 and 7 illustrate the payload encoded in the various coding schemes according to some examples of the present disclosure. In FIGS. 6 and 7 shaded data (shown with horizontal line shading) represents that the shaded data is included in the payload. Diagram 600 shows the end-to-end SEC payload according to some examples, which consists of the 8 data dice, the LRAID CRC, the E2E CRC, the metadata MD, and the RAID parity die. Diagram 605 shows the LRAID payload as the eight data dice, the LRAID CRC bits, the E2E CRC bits, and the metadata bits. Diagram 700 shows the LRAID CRC payload which includes the eight data dice, the E2E CRC bits and the metadata bits. Diagram 705 shows the E2E CRC payload, which includes the eight data dice and the metadata bits.

A person of ordinary skill in the art will appreciate that the number of bits shown in FIG. 2, is exemplary, and various bit numbers may be modified within the scope of the present disclosure. For example, the number of e2e CRC bits may be modified depending on the desired level of SDC. In some examples, no e2e CRC may be used. In some examples, the number of LRAID CRC bits may be adjusted up or down to suit the level of SDC desired. In some examples, rather than e2e SEC, the system may use SECDED (Single Error Correction Double Error Detection) which utilizes one more parity bit to detect a second error, which may reduce the number of metadata bits.

Figure 8:
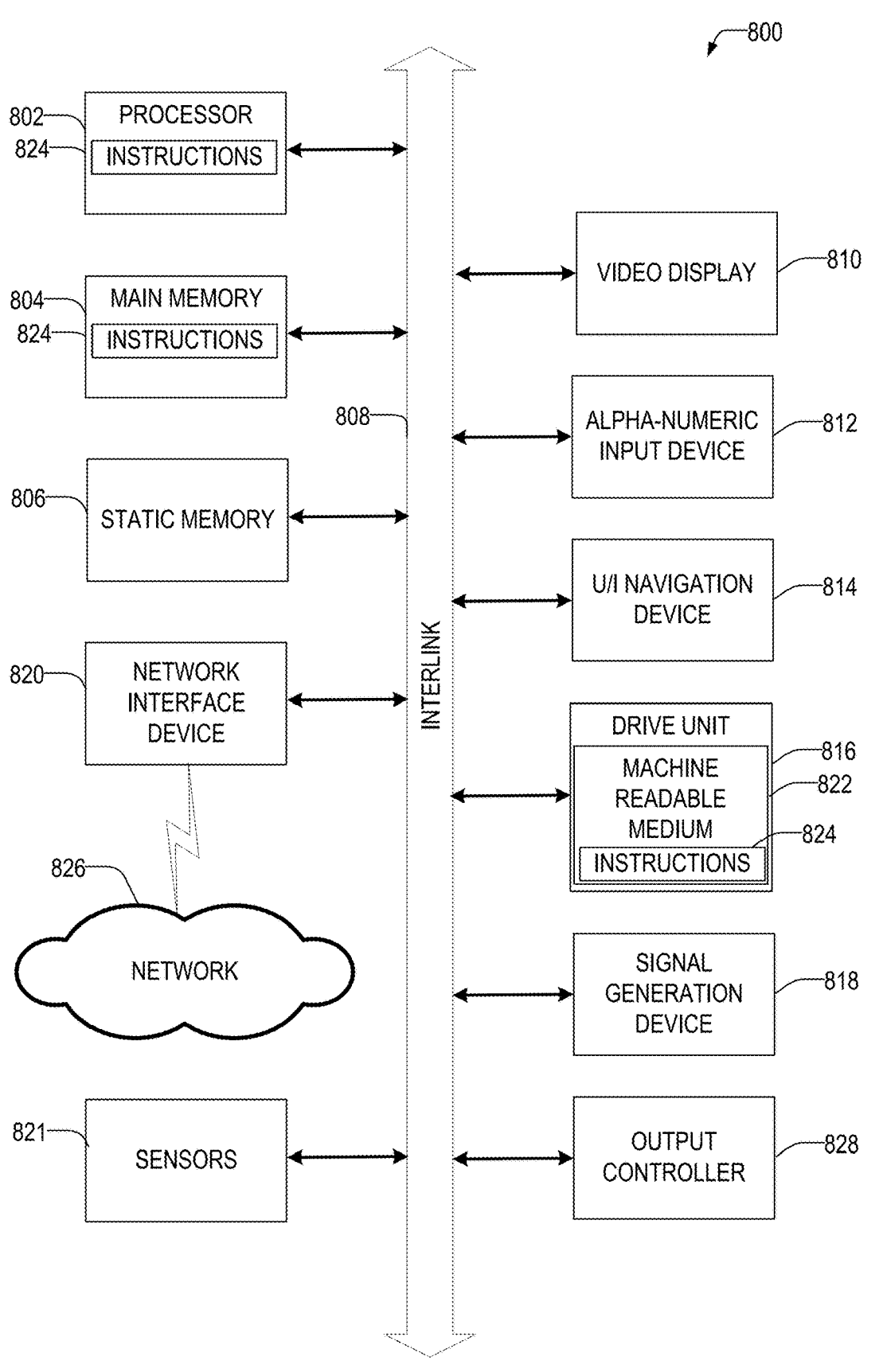
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may be performed. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be in the form of a computer system (e.g., a distributed computing system), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 800 may be configured to be, may include, or may show components of the memory system of FIG. 3. Main memory 804 may be configured as shown in FIGS. 1, 2, 320 of FIG. 3, FIGS. 6-7. A memory controller, in the form of a processor, such as processor 802, or another processor (ASIC, or other circuits) may be configured (either by hardware or software) perform the operations of FIG. 5 and to perform the encoding shown throughout.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 800 may include one or more hardware processors, such as processor 802. Processor 802 may be a central processing unit (CPU), a graphics processing unit (GPU), a hardware processor core, or any combination thereof. Machine 800 may include a main memory 804 and a static memory 806, some or all of which may communicate with each other via an interlink (e.g., bus) 808. Examples of main memory 804 may include Synchronous Dynamic Random-Access Memory (SDRAM), such as Double Data Rate memory, such as DDR4 or DDR5. Interlink 808 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The Machine 800 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

Other Notes and Examples

Example 1 is a memory system, comprising a double data rate (DDR) memory device, the DDR memory device having a plurality of dice, a first set of two or more of the plurality of dice storing user data without single error correction bits and a second set of one or more of the plurality of dice storing parity bits, each of the parity bits corresponding to a parity function applied to same bit positions of the first set of the plurality of dice, the second set of the one or more of the plurality of dice storing cyclic redundancy check (CRC) data; a controller, the controller configured to perform operations comprising: reading data from the DDR memory device; performing a CRC check on the user data; determining whether the CRC check passed or failed; responsive to a determination that the CRC check failed, utilizing the parity bits to correct the user data and providing the corrected user data to a host; and responsive to a determination that the CRC has not failed, providing the user data to a host.

In Example 2, the subject matter of Example 1 includes, the second set of the one or more of the plurality of dice includes a plurality of metadata bits.

In Example 3, the subject matter of Examples 1-2 includes, the second set of the one or more of the plurality of dice includes single error correction code (SEC) data, and wherein the controller is further configured to perform operations comprising: prior to performing the CRC check, decoding the data using the SEC data, and wherein the CRC check and the utilizing the parity bits is done to the decoded data.

In Example 4, the subject matter of Examples 1-3 includes, responsive to a determination that the CRC check failed, determining that no combination of corrections using the parity bits results in a passed CRC check, and in response, performing the following operations without first decoding the data using the SEC data: performing a CRC check on the user data; determining whether the CRC check passed or failed; responsive to a determination that the CRC check failed, utilizing the parity bits to correct the user data and providing the corrected user data to a host; and responsive to a determination that the CRC has not failed, providing the user data to the host.

In Example 5, the subject matter of Examples 1-4 includes, the SEC is a bounded SEC.

In Example 6, the subject matter of Examples 1-5 includes, the second set of the one or more of the plurality of dice includes end-to-end CRC data, and wherein the controller is further configured to perform operations comprising: prior to sending the data to the host, decoding the data using the end-to-end CRC data.

In Example 7, the subject matter of Examples 1-6 includes, the operations of reading the data are performed responsive to receiving a request from the host received over a Compute Express Link (CXL) interface.

In Example 8, the subject matter of Examples 1-7 includes, the first set of two or more of the plurality of dice storing user data comprises 8 dice, and the second set of one or more of the plurality of dice comprises two dice, a first dice storing the parity bits and a second dice storing CRC data, SEC data, end-to-end CRC data, and metadata.

In Example 9, the subject matter of Examples 1-8 includes, the CRC data is 32 bits, the SEC data is 10 bits, the end-to-end CRC data is 14 bits, and the metadata is 8 bits.

In Example 10, the subject matter of Examples 1-9 includes, the DDR memory device is a DDR5 memory device.

Example 11 is a method for storing data, the method comprising: using a controller of a double data rate (DDR) memory device to perform operations, the DDR memory device having a plurality of dice, a first set of two or more of the plurality of dice storing user data without single error correction bits and a second set of one or more of the plurality of dice storing parity bits, each of the parity bits corresponding to a parity function applied to same bit positions of the first set of the plurality of dice, the second set of the one or more of the plurality of dice storing cyclic redundancy check (CRC) data, the operations comprising: reading data from the DDR memory device; performing a CRC check on the user data; determining whether the CRC check passed or failed; responsive to a determination that the CRC check failed, utilizing the parity bits to correct the user data and providing the corrected user data to a host; and responsive to a determination that the CRC has not failed, providing the user data to a host.

In Example 12, the subject matter of Example 11 includes, the second set of the one or more of the plurality of dice includes a plurality of metadata bits.

In Example 13, the subject matter of Examples 11-12 includes, the second set of the one or more of the plurality of dice includes single error correction code (SEC) data, and wherein the controller is further configured to perform operations comprising: prior to performing the CRC check, decoding the data using the SEC data, and wherein the CRC check and the utilizing the parity bits is done to the decoded data.

In Example 14, the subject matter of Examples 11-13 includes, responsive to a determination that the CRC check failed, determining that no combination of corrections using the parity bits results in a passed CRC check, and in response, performing the following operations without first decoding the data using the SEC data: performing a CRC check on the user data; determining whether the CRC check passed or failed; responsive to a determination that the CRC check failed, utilizing the parity bits to correct the user data and providing the corrected user data to a host; and responsive to a determination that the CRC has not failed, providing the user data to the host.

In Example 15, the subject matter of Examples 11-14 includes, the SEC is a bounded SEC.

In Example 16, the subject matter of Examples 11-15 includes, the second set of the one or more of the plurality of dice includes end-to-end CRC data, and wherein the controller is further configured to perform operations comprising: prior to sending the data to the host, decoding the data using the end-to-end CRC data.

In Example 17, the subject matter of Examples 11-16 includes, the operations of reading the data are performed responsive to receiving a request from the host received over a Compute Express Link (CXL) interface.

In Example 18, the subject matter of Examples 11-17 includes, the first set of two or more of the plurality of dice storing user data comprises 8 dice, and the second set of one or more of the plurality of dice comprises two dice, a first dice storing the parity bits and a second dice storing CRC data, SEC data, end-to-end CRC data, and metadata.

In Example 19, the subject matter of Examples 11-18 includes, the CRC data is 32 bits, the SEC data is 10 bits, the end-to-end CRC data is 14 bits, and the metadata is 8 bits.

In Example 20, the subject matter of Examples 11-19 includes, the DDR memory device is a DDR5 memory device.

What is claimed is:

1. A memory system, comprising:
A memory device, the memory device having a plurality of dice, a first set of two or more of the plurality of dice storing user data without single error correction bits and a second set of one or more of the plurality of dice storing parity bits, each of the parity bits storing a value corresponding to a parity function applied to data at a same bit position on each of the dice in the first set of the plurality of dice, the second set of the one or more of the plurality of dice storing cyclic redundancy check (CRC) data;
a controller, the controller configured to perform operations comprising:
reading user data from the memory device;
performing a CRC check on the user data;
determining whether the CRC check passed or failed;
responsive to a determination that the CRC check failed, utilizing the parity bits to correct the user data and providing the corrected user data to a host; and
responsive to a determination that the CRC has not failed, providing the user data to the host.

2. The memory system of claim 1, wherein the second set of the one or more of the plurality of dice includes a plurality of metadata bits.

3. The memory system of claim 1, wherein the second set of the one or more of the plurality of dice includes single error correction code (SEC) data, and wherein the controller is further configured to perform operations comprising:

prior to performing the CRC check, decoding the data using the SEC data, and wherein the CRC check and the utilizing the parity bits is done to the decoded data.

4. The memory system of claim 3, wherein the controller is further configured to perform operations comprising:

responsive to a determination that the CRC check failed, for each die in the first set, attempting to correct data of that die using the parity bits and performing a CRC check on the corrected data, and responsive to a determination that no single-die correction using the parity bits results in a passed CRC check, performing the following operations without first decoding the data using the SEC data:

performing a CRC check on the user data;

determining whether the CRC check passed or failed;

responsive to a determination that the CRC check failed, utilizing the parity bits to correct the user data and providing the corrected user data to the host; and responsive to a determination that the CRC has not failed, providing the user data to the host.

5. The memory system of claim 3, wherein the SEC is a bounded SEC.

6. The memory system of claim 3, wherein the second set of the one or more of the plurality of dice includes end-to-end CRC data that is computed from the user data and metadata, and wherein the controller is further configured to perform operations comprising:

prior to sending the data to the host, verifying integrity of the data using the end-to-end CRC data.

7. The memory system of claim 1, wherein the operations of reading the data are performed responsive to receiving a request from the host over a cache-coherent memory-semantic interconnect interface.

8. The memory system of claim 1, wherein the first set of two or more of the plurality of dice storing user data comprises 8 dice, and the second set of one or more of the plurality of dice comprises two dice, a first dice storing the parity bits and a second dice storing CRC data, SEC data, end-to-end CRC data, and metadata.

9. The memory system of claim 8, wherein the CRC data is 32 bits, the SEC data is 10 bits, the end-to-end CRC data is 14 bits, and the metadata is 8 bits.

10. The memory system of claim 1, wherein the memory device is a DDR5 memory device.

11. A method for storing data, the method comprising:

using a controller of a memory device to perform operations, the memory device having a plurality of dice, a first set of two or more of the plurality of dice storing user data without single error correction bits and a second set of one or more of the plurality of dice storing parity bits, each of the parity bits storing a value corresponding to a parity function applied to data at a same bit position on each of the dice in the first set of the plurality of dice, the second set of the one or more of the plurality of dice storing cyclic redundancy check (CRC) data, the operations comprising:

reading user data from the memory device;

performing a CRC check on the user data;

determining whether the CRC check passed or failed;

responsive to a determination that the CRC check failed, utilizing the parity bits to correct the user data and providing the corrected user data to a host; and responsive to a determination that the CRC has not failed, providing the user data to the host.

12. The method of claim 11, wherein the second set of the one or more of the plurality of dice includes a plurality of metadata bits.

13. The method of claim 11, wherein the second set of the one or more of the plurality of dice includes single error correction code (SEC) data, and wherein the controller is further configured to perform operations comprising:

prior to performing the CRC check, decoding the data using the SEC data, and wherein the CRC check and the utilizing the parity bits is done to the decoded data.

14. The method of claim 13, wherein the controller is further configured to perform operations comprising:

responsive to a determination that the CRC check failed, for each die in the first set, attempting to correct data of that die using the parity bits and performing a CRC check on the corrected data, and responsive to a determination that no single-die correction using the parity bits results in a passed CRC check, performing the following operations without first decoding the data using the SEC data:

performing a CRC check on the user data;

determining whether the CRC check passed or failed;

responsive to a determination that the CRC check failed, utilizing the parity bits to correct the user data and providing the corrected user data to the host; and responsive to a determination that the CRC has not failed, providing the user data to the host.

15. The method of claim 13, wherein the SEC is a bounded SEC.

16. The method of claim 13, wherein the second set of the one or more of the plurality of dice includes end-to-end CRC data, and wherein the controller is further configured to perform operations comprising:

prior to sending the data to the host, decoding the data using the end-to-end CRC data.

17. The method of claim 11, wherein the operations of reading the data are performed responsive to receiving a request from the host over a cache-coherent memory-semantic interconnect interface.

18. The method of claim 11, wherein the first set of two or more of the plurality of dice storing user data comprises 8 dice, and the second set of one or more of the plurality of dice comprises two dice, a first dice storing the parity bits and a second dice storing CRC data, SEC data, end-to-end CRC data, and metadata.

19. The method of claim 18, wherein the CRC data is 32 bits, the SEC data is 10 bits, the end-to-end CRC data is 14 bits, and the metadata is 8 bits.

20. The method of claim 11, wherein the memory device is a DDR5 memory device.

* * * * *